(12) United States Patent
Ameres et al.

(10) Patent No.: US 7,027,654 B1
(45) Date of Patent: Apr. 11, 2006

(54) VIDEO COMPRESSION SYSTEM

(75) Inventors: Eric L. Ameres, Cohoes, NY (US);
James B. Bankoski, Wynantskill, NY (US); Yaowu Xu, Clifton Park, NY (US); Scott J. La Varnway, Chestertown, NY (US); Adrian W. Grange, Cambridgeshire (GB); Paul G. Wilkins, Cambridge (GB)

(73) Assignee: On2 Technologies, New York, NY (US)

( * ) Notice: Subject to any disclaimer, the term of this patent is extended or adjusted under 35 U.S.C. 154(b) by 35 days.

(21) Appl. No.: 10/219,774

(22) Filed: Aug. 15, 2002

Related U.S. Application Data

(60) Provisional application No. 60/316,316, filed on Aug. 31, 2001, provisional application No. 60/312,941, filed on Aug. 16, 2001.

(51) Int. Cl.
*G06K 9/40* (2006.01)

(52) U.S. Cl. .................. 382/236; 382/260; 382/266

(58) Field of Classification Search ............... 382/232, 382/236, 248, 250, 260, 261, 266, 268, 269; 375/240.29
See application file for complete search history.

(56) References Cited

U.S. PATENT DOCUMENTS

| | | | |
|---|---|---|---|
| 6,041,145 A * | 3/2000 | Hayashi et al. | 382/268 |
| 6,167,164 A * | 12/2000 | Lee | 382/261 |
| 6,188,799 B1 * | 2/2001 | Tan et al. | 382/260 |
| 6,240,135 B1 * | 5/2001 | Kim | 375/240.01 |
| 6,529,638 B1 * | 3/2003 | Westerman | 382/275 |
| 6,707,952 B1 * | 3/2004 | Tan et al. | 382/268 |

* cited by examiner

*Primary Examiner*—Tommy D. Lee
(74) *Attorney, Agent, or Firm*—Levisohn, Berger & Langsam, LLP

(57) ABSTRACT

An improved video compression system in which the coefficient transform is sped up via folding transposition of coefficients into the token extraction phase. This is accomplished by filling a group of blocks coefficient buffers with 0's before the start of coefficient decoding, extracting the token from the bitstream and placing any extracted coefficient value which is non zero into the transposed order that best suits the target processor.

14 Claims, 2 Drawing Sheets

VIDEO COMPRESSION SYSTEM

RELATED APPLICATIONS

This nonprovisional application claims domestic priority to prior provisional application Ser. No. 60/312,941, filed Aug. 16, 2001, and to provisional application Ser. No. 60/316,316, filed Aug. 31, 2001. Both provisional applications are incorporated herein by reference.

PRIOR ART

U.S. Pat. Nos. 6,178,205; 6,167,164; and 6,188,799 entitled "AN EFFICIENT REAL TIME ALGORITHM TO SIMULTANEOUSLY REDUCE BLOCKING AND RINGING ARTIFACTS OF COMPRESSED VIDEO" by Min-Cheol Hong, Chang Mo Yon and Young Man Park, assigned to Digital Media Research Lab IEEE 1999.

COMPUTER PROGRAM LISTING APPENDIX

The following computer software files, submitted herewith on one (1) CD-R compact disc, are incorporated by reference herein:

| Format: OS: | | | IBM Compatible Windows |
|---|---|---|---|
| Directory of CD | | | |
| 08/06/02 | 01:53 p | 12,710 | blockmap.c |
| 08/06/02 | 01:53 p | 8,616 | blockmapping.c |
| 08/06/02 | 01:53 p | 1,884 | blockmapping.h |
| 08/06/02 | 01:53 p | 5,590 | borders.c |
| 08/06/02 | 01:53 p | 4,796 | cbitman.c |
| 08/06/02 | 01:53 p | 1,660 | cbitman.h |
| 08/06/02 | 01:53 p | 6,203 | cframew.c |
| 08/06/02 | 01:53 p | 1,510 | cframew.h |
| 08/06/02 | 01:53 p | 10,181 | cfrarray.c |
| 08/06/02 | 01:53 p | 1,376 | cfrarray.h |
| 08/06/02 | 01:53 p | 4,066 | codec_common.h |
| 08/06/02 | 01:53 p | 17,991 | compdll.h |
| 08/06/02 | 01:53 p | 18,253 | comp_globals.c |
| 08/06/02 | 01:53 p | 63,483 | coptfunctions.c |
| 08/06/02 | 01:53 p | 8,194 | coptfunctionsppc.c |
| 08/06/02 | 01:53 p | 91,862 | cscanyuv.c |
| 08/06/02 | 01:53 p | 3,351 | csystemdependant.c |
| 08/06/02 | 01:53 p | 31,760 | cwmtfunctions.c |
| 08/06/02 | 01:53 p | 2,677 | dct.h |
| 08/06/02 | 01:53 p | 36,952 | dct_decode.c |
| 08/06/02 | 01:53 p | 24,698 | ddecode.c |
| 08/06/02 | 01:53 p | 51,397 | deblock.c |
| 08/06/02 | 01:53 p | 67,131 | deblock_av.c |
| 08/06/02 | 01:53 p | 235,667 | deblockopt.c |
| 08/06/02 | 01:53 p | 97,589 | deblockwmtopt.c |
| 08/06/02 | 01:53 p | 34,241 | decodeandrecon.c |
| 08/06/02 | 01:53 p | 34,050 | dering.c |
| 08/06/02 | 01:53 p | 13,128 | dering_av.c |
| 08/06/02 | 01:53 p | 74,338 | deringopt.c |
| 08/06/02 | 01:53 p | 26,202 | deringwmtopt.c |
| 08/06/02 | 01:53 p | 15,347 | dframer.c |
| 08/06/02 | 01:53 p | 6,061 | doptsystemdependant.c |
| 08/06/02 | 01:53 p | 5,014 | dsystemdependant.c |
| 08/06/02 | 01:53 p | 15,146 | encode.c |
| 08/06/02 | 01:53 p | 13,282 | fdct.c |
| 08/06/02 | 01:53 p | 20,029 | fdct_av.c |
| 08/06/02 | 01:53 p | 28,841 | FilterOptMapca.c |
| 08/06/02 | 01:53 p | 7,873 | framecopy.c |
| 08/06/02 | 01:53 p | 22,745 | frameini.c |
| 08/06/02 | 01:53 p | 32,626 | frarray.c |
| 08/06/02 | 01:53 p | 953 | getinfo.c |
| 08/06/02 | 01:53 p | 11,819 | huffman.c |
| 08/06/02 | 01:53 p | 3,890 | huffman.h |
| 08/06/02 | 01:53 p | 52,378 | hufftables.h |

-continued

| Format: OS: | | | IBM Compatible Windows |
|---|---|---|---|
| 08/06/02 | 01:53 p | 36,321 | IDctMapCA.c |
| 08/06/02 | 01:53 p | 27,678 | idctpart.c |
| 08/06/02 | 01:53 p | 28,483 | idctpartppc.c |
| 08/06/02 | 01:53 p | 24,485 | idct_av.c |
| 08/06/02 | 01:53 p | 33,873 | loopfilter.c |
| 08/06/02 | 01:53 p | 18,704 | loopf_asm.c |
| 08/06/02 | 01:53 p | 21,372 | loopf_ppc.c |
| 08/06/02 | 01:53 p | 50,048 | mcomp.c |
| 08/06/02 | 01:53 p | 3,721 | mcomp.h |
| 08/06/02 | 01:53 p | 13,520 | misc_common.c |
| 08/06/02 | 01:53 p | 1,729 | misc_common.h |
| 08/06/02 | 01:53 p | 64,242 | mmxidct.c |
| 08/06/02 | 01:53 p | 36,143 | mmxrecon.c |
| 08/06/02 | 01:53 p | 19,616 | mventropy.c |
| 08/06/02 | 01:53 p | 3,055 | mventropy.h |
| 08/06/02 | 01:53 p | 30,648 | newloopfppc.c |
| 08/06/02 | 01:53 p | 48,799 | newlooptest_asm.c |
| 08/06/02 | 01:53 p | 43,844 | optfunctionsppc.c |
| 08/06/02 | 01:53 p | 16,328 | packvideo.c |
| 08/06/02 | 01:53 p | 16,487 | pbdll.h |
| 08/06/02 | 01:53 p | 27,588 | pbdll_if.c |
| 08/06/02 | 01:53 p | 10,769 | pb_globals.c |
| 08/06/02 | 01:53 p | 8,881 | pchost_mapca.h |
| 08/06/02 | 01:53 p | 32,370 | pickmodes.c |
| 08/06/02 | 01:53 p | 6,171 | postp.h |
| 08/06/02 | 01:53 p | 20,340 | postproc.c |
| 08/06/02 | 01:53 p | 3,515 | postproc_if.h |
| 08/06/02 | 01:53 p | 12,504 | predictmotion.c |
| 08/06/02 | 01:53 p | 1,253 | preproc.h |
| 08/06/02 | 01:53 p | 3,170 | preprocfunctions.c |
| 08/06/02 | 01:53 p | 502 | preprocconf.h |
| 08/06/02 | 01:53 p | 14,083 | preprocglobals.c |
| 08/06/02 | 01:53 p | 2,087 | preprocif.h |
| 08/06/02 | 01:53 p | 9,264 | preprocif.c |
| 08/06/02 | 01:53 p | 49,951 | quantize.c |
| 08/06/02 | 01:53 p | 3,835 | quantize.h |
| 08/06/02 | 01:53 p | 4,743 | quantindexmmx.c |
| 08/06/02 | 01:53 p | 4,489 | quantindexppc.c |
| 08/06/02 | 01:53 p | 10,807 | readtokensopt.c |
| 08/06/02 | 01:53 p | 15,450 | reconstruct.c |
| 08/06/02 | 01:53 p | 2,549 | reconstruct.h |
| 08/06/02 | 01:53 p | 1,703 | resource.h |
| 08/06/02 | 01:53 p | 23,818 | rowdiffscan.c |
| 08/06/02 | 01:53 p | 46,513 | scale.c |
| 08/06/02 | 01:53 p | 21,804 | scale_av.c |
| 08/06/02 | 01:53 p | 23,240 | simpledeblock_asm.c |
| 08/06/02 | 01:53 p | 12,240 | simpledeblocker.c |
| 08/06/02 | 01:53 p | 15,483 | simpledeblockppc.c |
| 08/06/02 | 01:53 p | 769 | StdAfx.h |
| 08/06/02 | 01:53 p | 1,661 | systemdependant.h |
| 08/06/02 | 01:53 p | 4,235 | timer.c |
| 08/06/02 | 01:53 p | 19,815 | tokenize.c |
| 08/06/02 | 01:53 p | 16,560 | transform.c |
| 08/06/02 | 01:53 p | 17,641 | unpack.c |
| 08/06/02 | 01:53 p | 18,895 | unpackvideo.c |
| 08/06/02 | 01:53 p | 30,389 | unpackvideoppc.c |
| 08/06/02 | 01:53 p | 4,738 | uoptsystemdependant.c |
| 08/06/02 | 01:53 p | 46,884 | vfwcomp.c |
| 08/06/02 | 01:53 p | 29,958 | vfwcomp_if.c |
| 08/06/02 | 01:53 p | 11,797 | vp31dtest.c |
| 08/06/02 | 01:53 p | 9,675 | vp31dxv.c |
| 08/06/02 | 01:53 p | 14,900 | vp31etest.c |
| 08/06/02 | 01:53 p | 2,334 | vp3d.h |
| 08/06/02 | 01:53 p | 134 | vp3eprefix.h |
| 08/06/02 | 01:53 p | 10,840 | vputil.c |
| 08/06/02 | 01:53 p | 13,669 | vputilasm.c |
| 08/06/02 | 01:53 p | 1,698 | vputil_if.h |
| 08/06/02 | 01:53 p | 64,250 | wmtidct.c |
| 08/06/02 | 01:53 p | 8,248 | wmtrecon.c |
| 08/06/02 | 01:53 p | 861 | xprintf.h |
| 116 File(s) | | 2,485,729 | bytes |
| | | 0 | bytes free |

BACKGROUND AND GENERAL DESCRIPTION

This application specifically relates to a method and apparatus for reducing the decode complexity of two dimensional inverse transforms on a vector process.

A typical digital video decoding system involves the following steps (among others).

For each block in a frame:
A) Extract quantized transform coefficients from the compressed bit-stream
B) Perform inverse quantization to reconstruct the transform coefficients
C) Perform an inverse transform (typically an IDCT) on the coefficients
D) Add the resultant values to a block predictor
E) Output the block results The 2-dimensional inverse transform functions typically take a large portion of the time to decode a frame due to their complexity.

The invention described here attempts to reduce the decoder complexity on vector processing machines that are capable of doing the same operation to multiple values stored sequentially in a machine's registers by lowering the complexity of the 2 dimensional transform.

A 2-dimensional separable inverse transform performed on a block typically involves performing the following steps:
 a) For each row of the block:
  Perform the same 1-dimensional inverse transform on the transform coefficients.
 b) For each column of the block column (resulting from (a)):
  Perform the same 1-dimensional inverse transform on the transform coefficients.

Since the 1-dimensional inverse transform usually involves performing exactly the same operations on a number of rows or columns in the block, vector processors are often used to reduce the decoding time. This is typically accomplished by filing vector processing registers with a value from each of N rows in the block (see diagram). The operations of the inverse transform are then performed on the N rows in parallel. And then the vector processing registers are filled with values from each of the N columns in the block and the inverse transform is then performed on the N columns in parallel.

In order to fill the vector processing registers quickly with different values from each row a programmer typically has two options:
 a) Transpose the coefficients so that the transform coefficients appear in the order that matches the vector processor and load them directly into the registers.
 b) Fill the vector registers one value at a time with the coefficient data.

Choice (a) requires numerous operations to perform the transpose and choice (b) requires numerous bit-mask AND/OR operations to place each coefficient into the register.

SUMMARY OF THE INVENTION

This invention attempts to address these issues. To do so:
 a) Fill an entire frame's coefficient buffers with 0 before the start of coefficient decoding.
 b) Extract the transform coefficient for a token from the bit-stream.
 c) If the coefficient value is non-zero place it in the transposed order that best suits the target vector processor.

This works better than performing the transpose or filling the vector registers one at a time as part of the inverse transform because there are typically many more zero than non-zero coefficients. As such we make only a few positional changes, and avoid doing one full transpose altogether.

Additional savings are achieved by an embodiment of this technique whereby the same coefficient for every block in the image is encoded in the bit-stream before moving on to the next coefficient. In this way, one look up can be performed for each coefficient in the transform to determine where to place the transform coefficient.

Since each processor has vector registers with different cardinality it is necessary to place the coefficients in the order that best suits the processor being used.

The specific embodiment uses an IDCT transform but the technique is equally applicable to any separable 2-dimensional transform, for example, the discrete wavelet transform or the generalized orthogonal transform.

DESCRIPTION OF THE PREFERRED EMBODIMENT

The invention includes enhanced video processing and compression and is further described hereinafter.

The encoder uses a motion estimator, block based 8×8 Discrete Cosine Transform (DCT), a quantizer, a variable length encoder, and a loop filter for smoothing block edges in the reconstruction buffer. The decoder uses a variable length decoder and inverse quantizer, a motion compensator and a loop filter for smoothing block edges.

Two separate image artifacts are produced as a result of the quantization step. A blocking artifact is produced when quantization of the DCT coefficients in adjacent blocks produces pixel values on the shared block edge that differ on either side of the edge by a greater amount than in the original image. A ringing or mosquito artifact results from the quantization of higher frequency components of the transform around strong edges in the image. This means that the transform basis vectors do not reinforce and cancel correctly, producing edges in the reconstruction near to the strong edge that were not present in the original image.

The current invention embodies two separate but dependent filters that attempt to remove these image artifacts in a manner that is low on decoder complexity:
 a) a de-blocking filter that reduces the blocking artifacts described above
 b) an edge-enhancement and de-ringing filter that attempts to reduce the mosquito noise or ringing artifacts at the same time it sharpens real text images.

Figure 2:
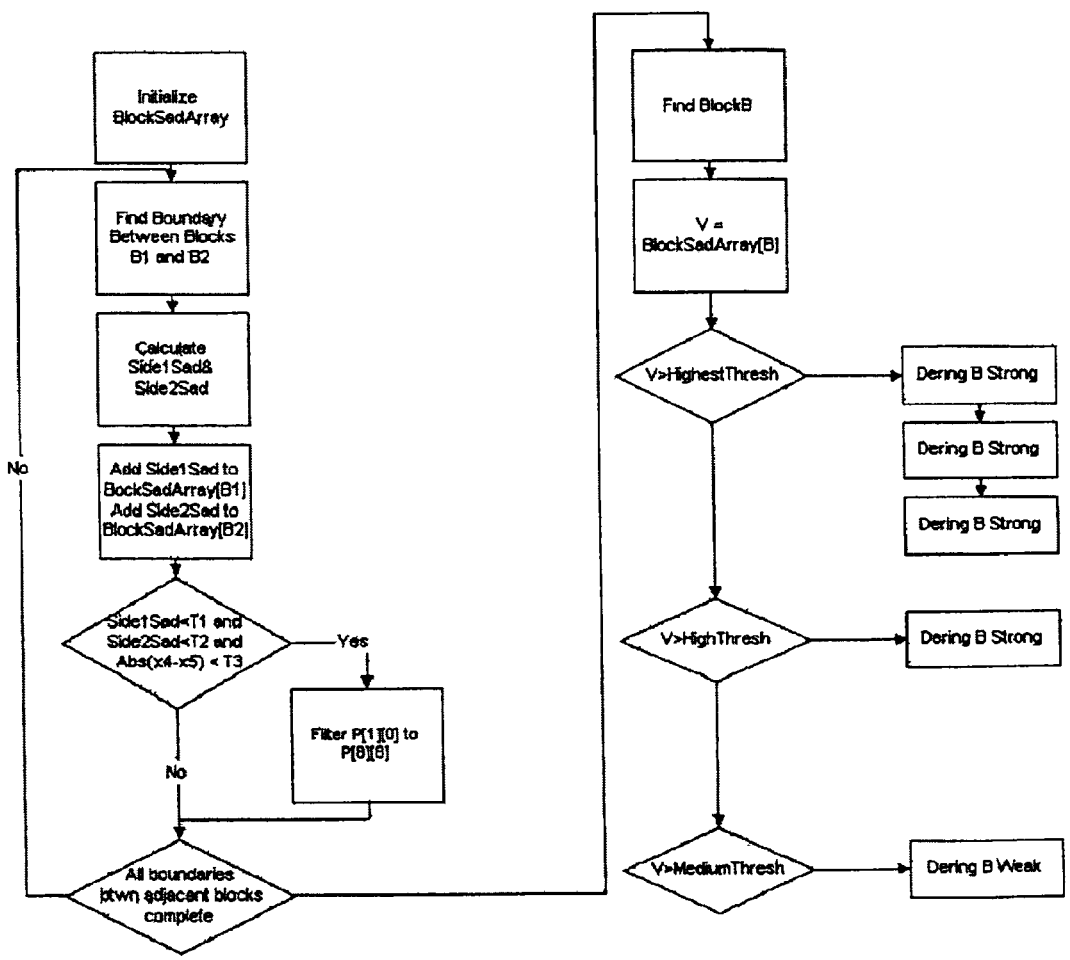
FIG. 2 is an overview block diagram of the embodiment.

A block diagram of the vectorized de-blocker is shown in FIG. 2.

The de-blocking filter of FIG. 2 works as follows:
Define an array, BlockSadArray, that contains one entry for each 8×8 block in the image. Initialize each entry of BlockSadArray to the value 0.
For every border between two 8×8 blocks of the image:
 At each of the eight positions along the border, examine the 10 pixels that lie in a direction perpendicular to the border, five from each block on either side (see diagram). Label these 10 pixels x0 . . . x4 and x5 . . . x9, respectively.

Computer the following sums at each of the eight positions on the border:

$$Side1SAD = \sum_{i+1}^{4} \text{abs}(x_i - x_{i-1})$$

$$Side2SAD = \sum_{i+5}^{9} \text{abs}(x_i - x_{i-1})$$

Add Side1Sad to the entry in BlockSadArray corresponding to the block that contained pixels x0 . . . x4 and Side2Sad to the entry in BlockSadArray corresponding to the block that contained pixels x5 . . . x9 (Note: BlockSadArray is used as input to the de-ringing filter).

Define three threshold values T1, T2, T3 that are computed as a function of the quantization level.

If the following condition is met:

$Side1Sad < 3*T1/2$ and $Side2Sad < 3*T2/2$ and $Abs(x4-x5) < T3$, then replace values x1 to x8 with low pass filtered values x1 to x8 as follows:

$x1' = (x0+x0+x0+x1*2+x2+x3+x4+4)/8$ $x2' = (x0+x0+x1+x2*2+x3+x4+x5+4)/8$ $x3' = (x0+x1+x2+x3*2+x4+x5+x6+4)/8$ $x4' = (x1+x2+x3+x4*2+x5+x6+x7+4)/8$ $x5' = (x2+x3+x4+x5*2+x6+x7+x8+4)/8$ $x6' = (x3+x4+x5+x6*2+x7+x8+x9+4)/8$ $x7' = (x4+x5+x6+x7*2+x8+x9+x9+4)/8$ $x8' = (x5+x6+x7+x8*2+x9+x9+x9+4)/8$

The invention encompasses the following novelty:
1: The decision as to whether or not to perform the de-blocking operation can easily be computed for several positions at a time using a vector processor (such as Intel Corporation Inc.'s MMX architecture) with very few operations.
2: The filter applied itself is much simpler than most and requires far fewer operations than those found in the prior art.
b) The edge enhancement and de-ringing filter works as follows:
For each 8×8 block in the image:
  Let BSAV be the BlockSadArray value corresponding to the current block.
  Define three threshold values Medium Thresh, High Thresh, Highest Thresh that are computed as a function of the quantization level such that Highest Thresh>High Thresh>Medium Thresh
  IF (BSAV>Highest Thresh)
    Apply the strong de-ringing filter in place to the block (described below) multiple times (based on how high BSAV is)
  ELSE IF (BSAV>High Thresh)
    Apply the strong de-ringing filter to the block (described below)
  ELSE IF (BSAV>Medium Thresh)
    Apply the weak de-ringing filter to the block (described below).

The strong de-ringing filter works as follows:
Calculate a maximum blurring modifier (HighModifier) and maximum sharpening modifier (LowModifier) by looking up a value based upon the level of quantization applied to the coefficients.

For the $j^{th}$ pixel in the $i^{th}$ image row, $P_{i,j}$, do the following:
Calculate the following four values:

$M_0 = \text{DeringModifier}(P_{i,j}, P_{i-1,j})$ $M_1 = \text{DeringModifier}(P_{i,j}, P_{i+1,j})$ $M_2 = \text{DeringModifier}(P_{i,j}, P_{i,1-j})$ $M_3 = \text{DeringModifier}(P_{i,j}, P_{i,-j+1})$ Where DeringModifier(X,&) is defined as follows:
Value=Constant+QuantizationLevel−Abs(X−Y)
IF (Value<LowModifier)
  Value=LowModifier
IF (Value>HighModifier)
  Value=HighModifier
Replace Pixel $P_{i,j}$ with $P_{i,j}'$ computed as follows:

$P_{i,j}' = (M_0*P_{i-1,j}+M_1*P_{i+1,j}+M_2*P_{ij-1}+M_3*P_{i,j+1}+(128-(M_0+M_1+M_2+M_3))*P_{i,j})/128$

The deblocker uses simple linear calculations and one dimensional filters to remove deblocking artifacts and to gather information used by the deringer filter to determine how many iterations to apply its filter. The deringing filter encompasses a pixel to pixel spatially adaptive filter that can both blur and sharpen. It does so by collecting the difference between neighboring pixels into a two dimensional array, applying a simple function to this array and then using the result as a convolution kernel. Since the function can produce both positive and negative tapes, the filter can perform both deringing and sharpening.

Figure 1:
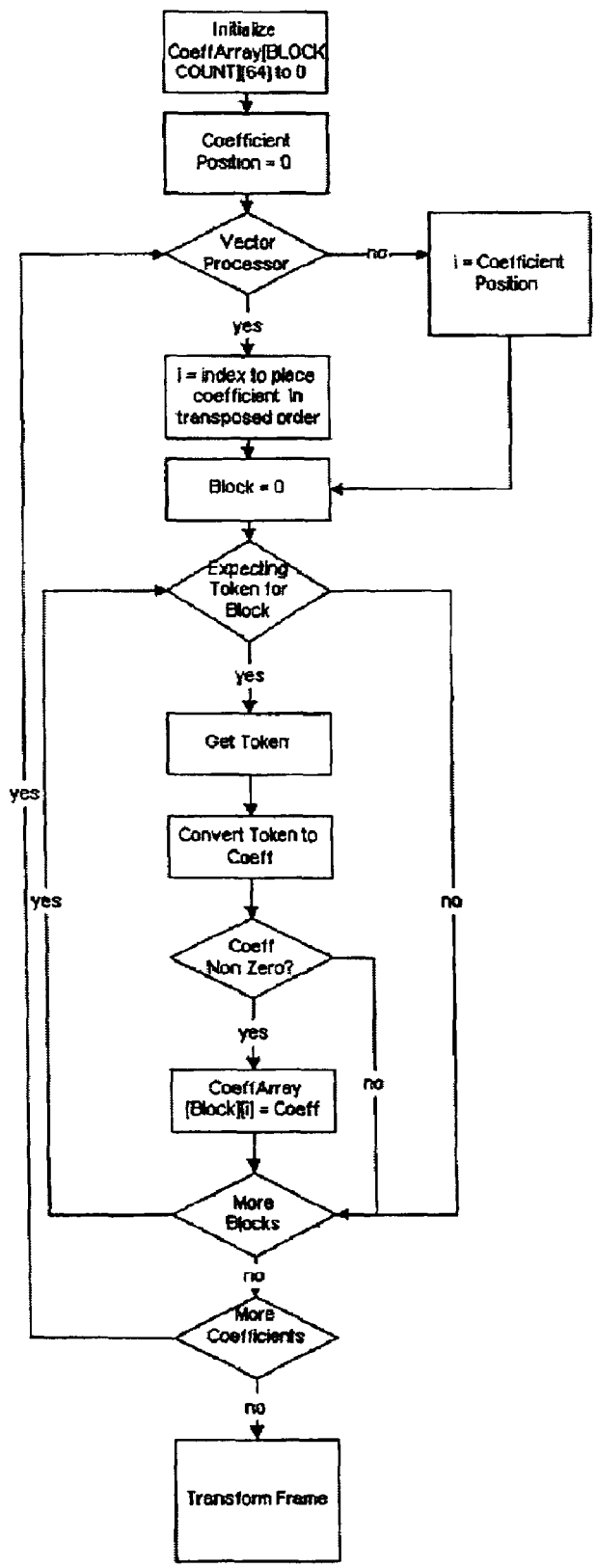
FIG. 1 is a block diagram of the embodiment.

The Weak de-ringing filter works exactly the same as above except that the High and Low Modifiers are smaller magnitude numbers and the DeringModifier Function works as follows:
Value=Constant+QuantizationLevel−2*Abs(X−Y)
IF (Value<LowModifier)
  Value=LowModifier
IF (Value>HighModifier)
  Value=HighModifier FIG. 1 describes the simplified process by which the 2d orthogonal transform works. The basic process is as follows: First initialize all of the coefficients for every block in a group of blocks to 0. Then determine the position of the best place in memory to place the first coefficient given the vector processor. Next extract the first coefficient for each block in a group of blocks, and write any non 0 coefficient to the appropriate location. Then determine the position of the best place in memory to place the second coefficient given the vector processor. Next extract the second coefficient for each block in a group of blocks, and write any non 0 coefficient to the appropriate location. Repeat this same process for each of the subsequent coefficients.

Enclosed with this application is a CD-Rom with the preferred embodiment illustrated by providing a listing in Source Code of the method, system and steps of this invention. Following a reading of said CD-Rom, the invention herein is again summarized.

The novelty of this approach in comparison to others found in prior art includes:

1: The selection of different kernel modifiers based upon the difference between the target pixel and its neighbors which is an extremely simple and solely integer based linear calculation that may be efficiently implemented on a vector processor.
2: The ability of the filter to both sharpen real image edges and blur away ringing artifacts and mosquito noise.
3: The usages of completely different de-ringing functions based upon sum absolute difference value information gathered by the de-blocker.
4: The ability to run the de-ringing functions iteratively based on the BlockSad value for the block.

In summary, the following table identifies some of the advantages, features and benefits of this invention.

| Feature | Description |
| --- | --- |
| Sharpen/De-ringing Filter | A spatially adaptive kernel filter in which the kernel modifiers are determined by applying a non-continuous function on the pixel's neighborhood. The filter is capable of both sharpening and blurring depending on the neighborhood. Different functions and number of iterations are used based upon the local variance measures determined by the deblocking filter and the quantization level used in building the block. |
| Simplified De-blocker | An extremely simple 1 dimensional kernel filter is applied across block boundaries that differs based upon the variance across the block boundary and within the block border. The total amount adjusted is determined by the quantization level. |
| MV cost | The selection process of a new motion vector is ties to the cost of transmitting that specific mv (a higher value costs more). In addition the choice to use a mv is tied to the specific quantization level of the frame. Error metrics that measured error by performing a fdct and estimating the number of bits to achieve perceptual losslessness (defined via several papers) is employed. This measure was used to keep all of the costs in bits and could thus properly weight the cost of a new mv against the benefits. |
| Iterative MV adjustment | An iterative process is used for motion vector selection that in the first pass would mark all of the blocks as having a similar enough mv to use the first mv encountered in the neighborhood and in the second pass would pick a best mv for that neighborhood. |
| Datarate control using a model of the players buffer | A datarate control stepping mechanism is used that does not allow any frame's quantization level to go above a certain level until an internal model of the player's buffer is beyond a certain point, at which point a new maximum level of quantization is chosen. This same model of the player's buffer is used to determine whether or not to drop frames (now with a dampened threshold on the buffer overrun). We also use the model to decide when to undershoot the datarate to improve buffer fullness. The model is used to decide when to perform internal spatial resampling. |
| Datarate Control Using Error | Selection of the quantizer is now performed after all of the modes are chosen. A function based on an error metric for the frame which equals the sum of the errors for each selected block and the total number of blocks to be coded is used to pick a quantizer. |
| Auto Key Framing | The keyframing choice algorithm was made to take into account two different factors: the percentage of the background that stays exactly the same, and the percentage improvement in error score we get by using last frame predictors. |
| DCT Coefficient Arrangement | Novel Optimization Technique. Since the typical block has very few non zero coefficients, these coefficients are placed in transposed position as we read them off the bitstream rather than doing the transpose as part of the idct. The position these are placed differs based upon the specific processor. |
| Quantization Strategy | Baseline set of values for mid range quality not best quality. For higher Q the table value = Q multilier * baseline value. For lower Q the table value is interpolated between the baseline value and the minimum allowed value. |
| Rounding and ZeroBin Strategy | Basically instead of rounding in a conventional way, e.g., 0.5–1.5 = >1 the rounding behavior is changed to reflect the distribution of samples. Because there are a lot more samples in the range 0.5–1.0 than in the range 1.0–1.5, the mean value for the range 0.5–1.5 the is less than 1. To counter this the rounding behavior is changed. For example, one might say that 0.65–1.65 = >1.0. The aim here is to insure that the output value after inverse quantization is close to the mean of the samples that have ended up in that bin (and hence to minimize the mean square error). Where this gets complicated is around zero. Effectively the zero-bin size is increased somewhat. This is a mixed blessing. Increasing the zero-bin size too much can cause loss of sharpness (as observed in VP3.2) but it also has a profound effect on the output bit rate for a given Q setting. Thus at a fixed "bit rate" increasing the zero-bin size results in a lower average Q and hence more accurate coding of non-zero values. In VP4 these trade offs of rounding factor and zero bin size are adjusted according to the current Q value. At low Q (high quality) a smaller zero bin size and more conventional rounding is preferred, to insure sharpness. At higher Q, there is a shift towards truncation and a larger zero-bin size. For example one gets better results with a Q multiplier of 3.0 and a zero-bin size of +/−0.9 than with a Q multiplier of 5.0 and a zero bin size of +/−0.65. |
| Motion Prediction Block De-blocking | Rather than applying a typical reconstruction loop filter a de-blocking filter is applied only to the motion predictor of blocks that cross a block boundary. This gets around the problem with accumulating dct errors and improves the prediction of the block. |
| Token Order Transmittal Updates | All coefficients for a block are transmitted in order, but the tokens used also account for some information about blocks that have yet to be transmitted. |
| Context Based Entropy | For modes, MVs and display fragments different token set probabilities are chosen based upon the information transmitted nearby. For modes and MVs a 2 dimensional context model with additional variables (like frame type) that blends these 3 items together into a set of probability distributions is used. For DC and AC coefficients the token probability sets are determined by a function of what the coefficient is, what plane (Y, U, or V) it came from and a predetermined frame type. A more complex model of the context and probabilities that makes use of the neighboring blocks frame type and position within the block is used to select between probability sets. |
| Improved recovery block strategy | The same block in subsequent frames is now guaranteed to keep getting a chance for update until no further coefficients are generated for that block, irregardless of whether it is marked as background material. This helps avoid staleness issues. |
| Datarate Miscalculations | As a final trap for huge datarate miscalculations the code is now capable of restarting the compression of a frame if there were a large error. This same technique is used to redo a section in the standalone lagged compressor. |
| Post Processing Choices | The manner in which we use a calculation based on bits per mhz is used to determine between postprocessing mechanisms is new. |

Having described this invention with regard to specific embodiments, it is to be understood that the description is not meant as a limitation since further modifications and variations may be apparent or may suggest themselves to those skilled in the art. It is intended that the present application cover all such modifications and variations as fall within the scope of the appended claims.

The invention claimed is:

1. An encoder for compressing digital video signals comprising:
   a motion estimator;
   a block based discrete cosine transform system connected to said motion estimator;
   a quantizer connected to said discrete transform system, said quantizer producing separate image artifacts;
   a variable length encoder connected to said quantizer;
   a reconstruction buffer connected to said variable length encoder; and
   a loop filter connected to said reconstruction buffer for smoothing block edges therein,
   wherein said quantizer includes separate but functionally related filters which remove said separate image artifacts, said separate but functionally related filters including:
   a de-blocking filter reducing blocking artifacts which are produced by said quantizer; and
   an edge-enhancement and de-ringing filter to reduce ringing artifacts produced by said quantizer, said edge-enhancement and de-ringing filter sharpening said text images.

2. A system of separate but functionally related filters which remove separate image artifacts left over from a video compression and decompression process, comprising:
   a de-blocking filter reducing blocking artifacts which are produced by a quantizer in a reconstruction frame; and
   an edge-enhancement and deranging filter that reduces ringing artifacts produced by the quantizer, said edge-enhancement and de-ringing filter sharpening said images,
   wherein one of said filters utilizes information determined by the other of said filters.

3. A system according to claim 2, wherein said edge-enhancement filter utilizes information determined by said de-blocking filter, said utilized information comprising a block's adaptive strength value determined by said de-blocking filter.

4. A system according to claim 2, wherein said de-blocking filter utilizes a value calculated by said edge-enhancement filter.

5. An improved video decompression process comprising the steps of:
   filling substantially all of a video fiarne's coefficient buffers with 0's before starting coefficient decoding;
   extracting a coefficient of a transform for a token from a bitstream in zig zag order;
   placing coefficient values which are non-zero into a ordered coefficient buffer for case of use in an inverse transform, the order of the non-zero coefficient values dependent upon a type of processor that will be reconstructing the video frame.

6. An improved video decompression process according to claim 5, wherein the order of the non-zero coefficient values comprises one of raster order, transposed order, or transposed raster order.

7. An improved decompression process according to claim 6, wherein the order of the non-zero-coefficients is a transposed order, wherein an additional transpose is not required in order to speed up vector processing.

8. An improved video decompression process according to claim 6, wherein the order of the non-zero coefficient values is a transposed raster order determined by the type of processor used, further comprising the step of minimizing a number of operations of the decompression process by localizing transpositions.

9. An improved video decompression process according to claim 8, wherein
   if the processor is not a vector processor, the order of the non-zero coefficient values is a raster order.

10. An improved video decompression process according to claim 8, wherein
    if the processor is a 2-element vector processor, the order of the non-zero coefficient values is a raster order with each 2×2 block transposed.

11. An improved video decompression process according to claim 8, wherein
    if the processor is 4-element vector processor, the order of the non-zero coefficient values is a raster order with each 4×4 block transposed.

12. An improved video decompression process according to claim 8, wherein
    if the processor is an 8-element vector processor, the order of the non-zero coefficient values is a raster order with each 8×8 block transposed.

13. An improved video decompression process according to claim 8, wherein
    if the processor is an n-element vector processor, the order of the non-zero coefficient values is a raster order with each n×n block transposed.

14. An improved video decompression process according to claim 5, further comprising the steps of:
    performing an inverse transform on the coefficient buffer to convert the coefficients to one or more of pixel values or error signal values; and
    reconstructing the image from a predictor block and said pixel values or error signal values.

* * * * *